W. NASH.
Feed Rack.
No. 64,349. Patented April 30, 1867.
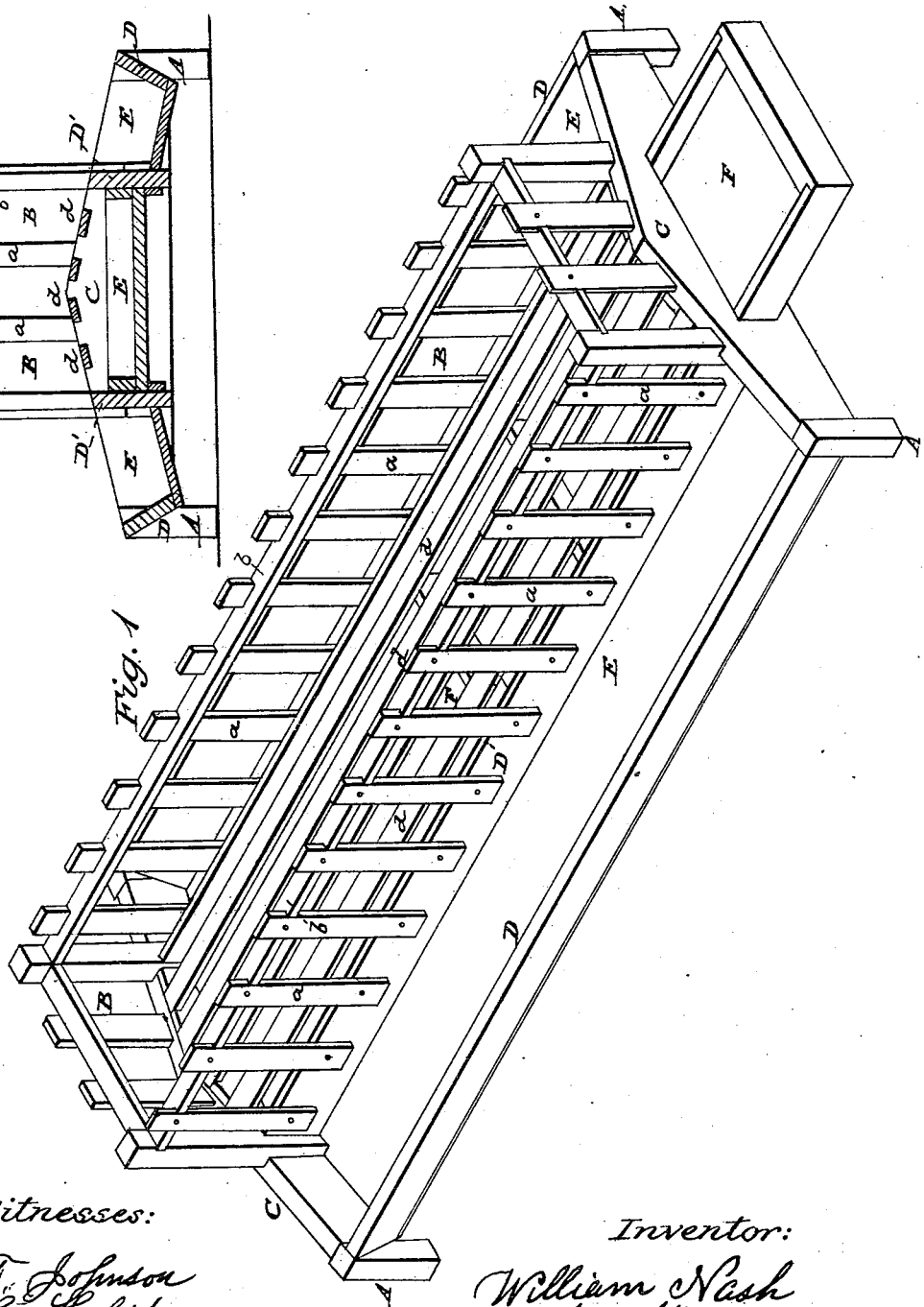

United States Patent Office.

WILLIAM NASH, OF CORNING, NEW YORK.

Letters Patent No. 64,349, dated April 30, 1867.

IMPROVEMENT IN HAY-RACK.

*The Schedule referred to in these Letters Patent and making part of the same.*

TO ALL WHOM IT MAY CONCERN:

Be it known that I, WILLIAM NASH, of Corning, in the county of Steuben, in the State of New York, have invented certain new and useful improvements in Hay-Racks and method of saving the grass-seed which is liberated from the hay while being fed; and the following is a full, clear, and exact description of the same, reference being had to the accompanying drawings, making a part of this specification, in which—

Figure 1 represents a perspective view of the feeding-rack, with one of the drawers partly opened, or drawn out.

Figure 2 shows a section through an end view.

The object of my invention is to make a convenient hay-rack for feeding and saving hay in foddering cattle, and at the same time to save the grass-seed which is liberated from the hay. My invention consists in the arrangement of drawers, placed under slats, which form the bottom, or that portion of the feeding-rack on which the hay is supported for the cattle to feed from. Also the arrangement and combination of the side troughs with the hay-rack and drawers.

To enable others to make and use my invention, I will describe it more fully, referring to the drawings and letters marked thereon.

I use posts A A, of such length as to place the feeding-rack B B at a suitable height for the cattle to reach the hay; the end pieces C C being made of plank, and framed into the posts A. Also the pieces D D', which help to form the troughs E E, outside of where the hay is placed, are made of plank, of any desired length, and are framed into or secured to the posts A A, and end pieces C C, through the middle portion of which are openings cut, into which are fitted drawers F F, to slide in under the bottom of the hay-receiver, which is composed of slats $d\ d\ d$ of wood placed longitudinally over the drawers F F. The upright slats $a\ a\ a\ a$, are secured to rails $b\ b$, at the top, and the inner side pieces of the trough D', leaving the openings between for the cattle to drag the hay through, and by so doing a large portion of the hay-seed is stripped or shaken off, and falls through between the slats $d\ d\ d$, and is safely deposited in the drawers F F below, where it can be secured safely, and the drawers taken out and emptied as often as is desirable. The outside troughs E E will also catch the grass-seed which falls outside of the slats $a\ a\ a$, when it can be scraped together and taken out and saved.

Thus it will be seen that by my invention, as above described, many dollars' worth of valuable grass-seed can be saved from the hay as it is being fed out in the winter season, which has heretofore been lost.

Having thus described my invention, what I claim as new, and desire to secure by Letters Patent, is—

1. The drawers F F, placed so as to be drawn out at the ends from under the longitudinal slats $d\ d\ d\ d$, which form the support for the hay in the rack; the drawers F F being so arranged as to receive and save the grass-seed as it is liberated from the hay in feeding, substantially in the manner and for the purposes herein described.

2. I claim the combination of the side troughs E E, hay-rack B, and drawers F F, constructed and operating substantially as and for the purposes herein set forth.

WILLIAM NASH.

Witnesses:
JOSEPH WALSTER,
J. F. TERRIL.